US010690923B1

(12) United States Patent
Luanava et al.

(10) Patent No.: US 10,690,923 B1
(45) Date of Patent: Jun. 23, 2020

(54) SCANNING SYSTEM FOR A TILING DISPLAY

(71) Applicant: Facebook Technologies, LLC, Menlo Park, CA (US)

(72) Inventors: Selso Luanava, Woodinville, WA (US); Jacques Gollier, Redmond, WA (US); William Thomas Blank, Bellevue, WA (US); Ying Geng, Sammamish, WA (US); David R. Perek, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/974,563

(22) Filed: May 8, 2018

Related U.S. Application Data

(60) Provisional application No. 62/519,973, filed on Jun. 15, 2017.

(51) Int. Cl.
| | | |
|---|---|---|
| *G02B 27/01* | (2006.01) | |
| *G02B 5/08* | (2006.01) | |
| *G06F 3/01* | (2006.01) | |
| *G06F 3/14* | (2006.01) | |
| *G02B 26/08* | (2006.01) | |
| *G03B 21/28* | (2006.01) | |

(52) U.S. Cl.
CPC ........... *G02B 27/0172* (2013.01); *G02B 5/08* (2013.01); *G02B 26/08* (2013.01); *G03B 21/28* (2013.01); *G06F 3/012* (2013.01); *G06F 3/013* (2013.01); *G06F 3/1446* (2013.01)

(58) Field of Classification Search
CPC .... G02B 27/0172; G02B 26/08; G02B 26/10; G02B 26/121; G02B 26/085; G02B 26/101; G02B 21/0048; G02B 5/08; G03B 21/28; G03B 21/2033; G06F 3/012; G06F 3/013; G06F 3/1446
USPC ............................................................ 345/8
See application file for complete search history.

(56) References Cited

U.S. PATENT DOCUMENTS

| 8,248,541 B2 * | 8/2012 | Brown ................. G02B 26/085 |
| | | 348/744 |
| 9,336,748 B1 * | 5/2016 | Katsis .................. G02B 26/123 |
| 2006/0007439 A1 * | 1/2006 | Corcoran .................. G01J 3/02 |
| | | 356/317 |
| 2006/0291042 A1 * | 12/2006 | Alfano ............... G02B 21/0048 |
| | | 359/368 |

(Continued)

*Primary Examiner* — Fred Tzeng
(74) *Attorney, Agent, or Firm* — Fenwick & West LLP

(57) ABSTRACT

A head mounted display (HMD) system includes a light source, a scanning mirror assembly, and an output screen. The light source includes source elements that emit image light. The scanning mirror assembly scans the image light at least along one dimension to form tiled portions of scanned image light of an output image. The scanning mirror assembly directs at least one of the tiled portions of the output image to a first position, and redirects at least one of the tiled portions of the output image to a second position adjacent to the first position. The scanning mirror assembly includes scanning mirrors operating within a first range of scanning frequencies along a slow axis and a second range of scanning frequencies along a fast axis. The output screen outputs a tiled image light to an eyebox region using the scanned image light.

20 Claims, 5 Drawing Sheets

(56) References Cited

U.S. PATENT DOCUMENTS

| | | | |
|---|---|---|---|
| 2009/0147224 A1* | 6/2009 | Kurozuka | H04N 9/3129 |
| | | | 353/98 |
| 2010/0073748 A1* | 3/2010 | Holmes | G02B 26/121 |
| | | | 359/199.1 |
| 2010/0079836 A1* | 4/2010 | Rothaar | G02B 26/101 |
| | | | 359/223.1 |
| 2013/0120819 A1* | 5/2013 | Rothaar | G02B 26/085 |
| | | | 359/224.1 |
| 2015/0370068 A1* | 12/2015 | Fujikawa | B60K 35/00 |
| | | | 359/566 |
| 2016/0004075 A1* | 1/2016 | Ando | G03B 21/2033 |
| | | | 353/13 |
| 2016/0047895 A1* | 2/2016 | Dussan | G01S 7/4817 |
| | | | 356/4.01 |
| 2016/0246042 A1* | 8/2016 | Enderlein | G02B 21/0048 |

* cited by examiner

SCANNING SYSTEM FOR A TILING DISPLAY

CROSS REFERENCE TO RELATED APPLICATIONS

This application claims the benefit of U.S. Provisional Application No. 62/519,973, filed on Jun. 15, 2017, which is incorporated by reference in its entirety.

BACKGROUND

The present disclosure generally relates to head-mounted displays, and specifically to a scanning system for a tiling display inside the head-mounted displays.

A head-mounted display (HMD) presents a viewable media to a user. In conventional display designs in HMDs, the factors considered are brightness, resolution, and compactness. Typical MEMS scanners use a collimated laser beam for scanning which can be high power and have a good efficiency to be directed to image location, and the image can be as bright as needed. While laser-based MEMS scanners are compact, they have issues with resolution. Mirror size and resonance frequency are two fundamental limits for resolution. In the far-field, mirror size determines the diffraction spread angle of the scanned laser beam. A large mirror is used to have a smaller diffraction spread angle. The resonance frequency determines how many lines can be scanned in a vertical (slow-axis) direction. Accordingly, a high resonance frequency is desired to generate more scan lines. When the mirror is made larger, its resonance frequency is smaller. Typical MEMS scanners are unable to scan more number of lines with a large mirror due to this trade-off between mirror size and resonance frequency.

SUMMARY

Embodiments relate to a head mounted display (HMD) system that includes a light source, a scanning mirror assembly, and an output screen. The light source includes source elements that emit image light. The scanning mirror assembly scans the image light at least along one dimension to form tiled portions of scanned image light. The scanning mirror assembly includes one or more scanning mirrors that operate within a first range of scanning frequencies along a slow axis and a second range of scanning frequencies along a fast axis. The scanning mirror assembly directs at least one of the tiled portions of the output image to a first position, and the scanning mirror assembly redirects at least one of the tiled portions of the output image to a second position next to the first position. The output screen outputs a tiled image light to an eyebox region using the scanned image light.

Embodiments also relate to a tiling display block that includes a light source, a scanning mirror assembly, and an output screen. The light source includes source elements that emit image light. The scanning mirror assembly scans the image light at least along one dimension to form tiled portions of scanned image light. The scanning mirror assembly includes one or more scanning mirrors that operate within a first range of scanning frequencies along a slow axis and a second range of scanning frequencies along a fast axis. The scanning mirror assembly directs at least one of the tiled portions of the output image to a first position, and the scanning mirror assembly redirects at least one of the tiled portions of the output image to a second position next to the first position. The output screen outputs a tiled image light to an eyebox region using the scanned image light.

Figure 1A:
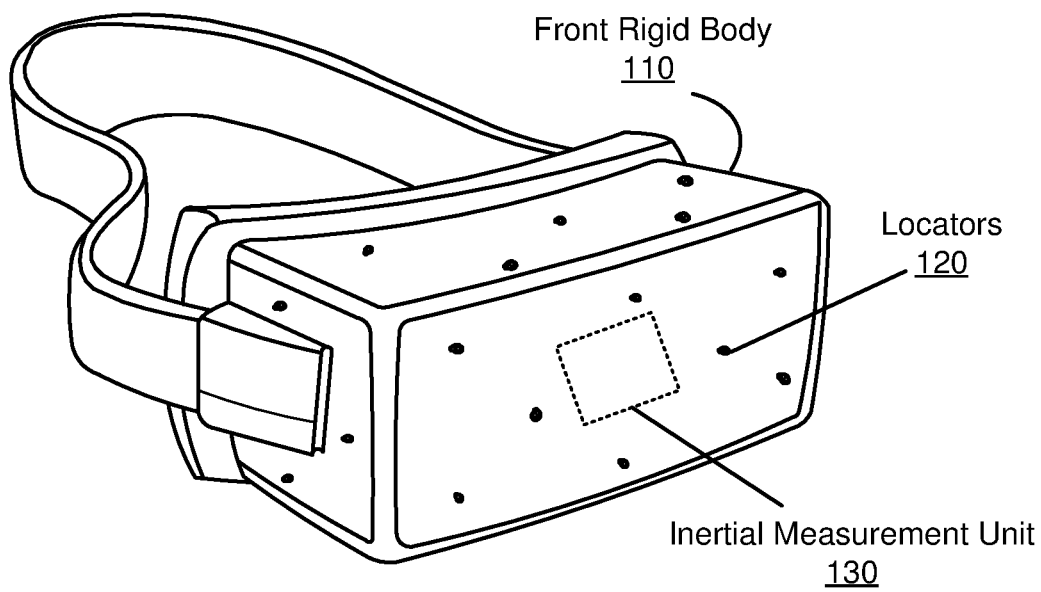
FIG. 1A is a diagram of a HMD, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A head mounted display (HMD) includes a scanning system for tiling display. The HMD presents content via an electronic display to a user at a specific focal distance. The scanning system includes a scanning component that scans a display from an optical source in a tiled manner to generate an output image. For example, the display may emit a first portion of an output image, which the scanning system directs to a first portion. The display may then emit a second portion of the output image, and the scanning system redirects the second portion to a second position that is adjacent to the first portion. In this manner, the HMD tiles the image which is presented to a user wearing the HMD.

The scanning system inside the HMD reduces the frequency of scanning the output image. For example, conventional scanning systems operating at scanning frequencies of around 40 kHz use a relatively larger mirror (e.g. diameter above 4 mm) due to design constraints. Such scanning systems often result in poor resolution of the output image (e.g. less than 1 arcmin along a specific direction) displayed to the user's eye. In contrast, the scanning system in the HMD disclosed herein has scanning frequencies along a slow axis of at most 1 kHz and scanning frequencies along a fast axis varying from 20 to 40 kHz, and the scanning system includes one or more scanning mirrors with a diameter in the range of 1 to 3 mm. Thus, the scanning system provides a trade-off between the scanning frequencies and mirror size of the scanning mirrors while not compromising the resolution of the output image displayed to the user's eye. In some embodiments, the scanning system for tiling display may be part of a near-eye display (NED). The NED is used for presenting media to a user. The NED may be part of an artificial reality system.

FIG. 1A is a diagram of a HMD 100, in accordance with an embodiment. The HMD 100 includes a front rigid body 110. The front rigid body 110 includes a plurality of locators 120 and an inertial measurement unit (IMU) 130. The plurality of locators 120 are located in fixed positions on the front rigid body 110 relative to one another. Each of the locators 120 emit light that is detectable by an imaging device (not shown). The IMU 130 is an electronic device that generates fast calibration data based on measurement signals received from one or more of the position sensors (not shown). In embodiments, where the HMD 100 operates as in an AR or MR environment, portions of the HMD 100 are at least partially transparent to light in the visible band, such that light external to the HMD 100 may be combined with displayed light and presented to the user.

Figure 1B:
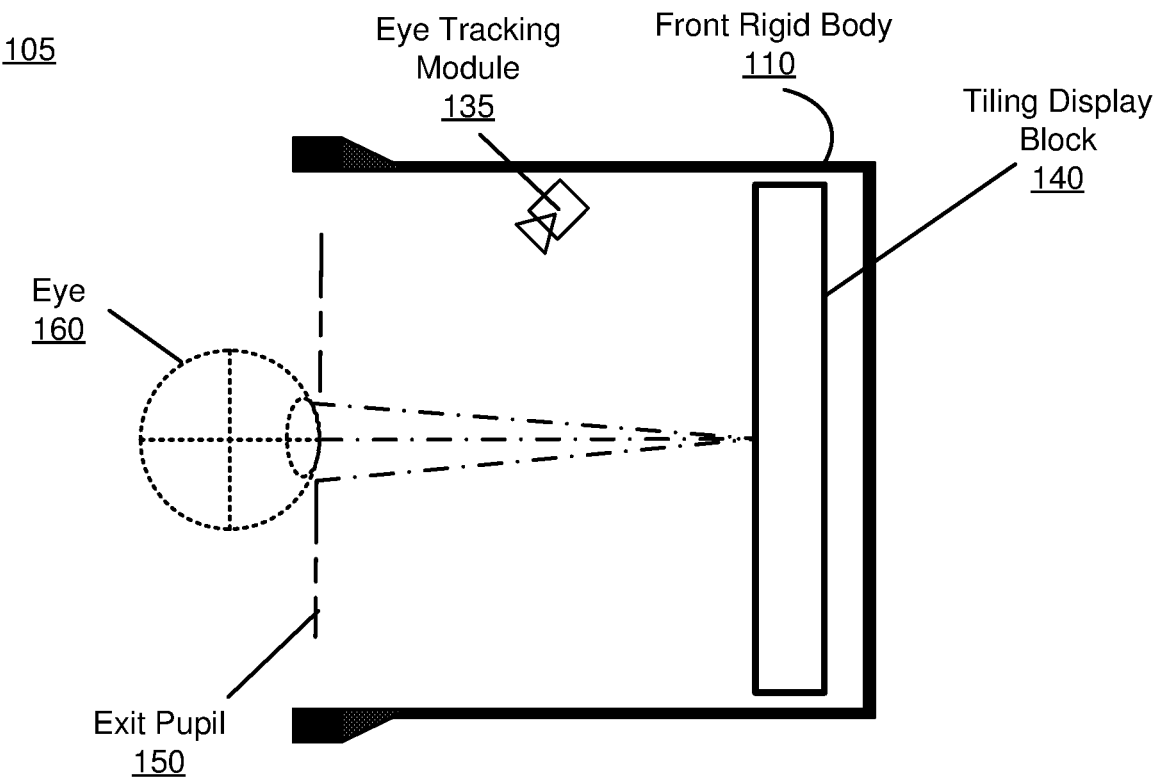
FIG. 1B is a cross section of a front rigid body of the HMD in FIG. 1A, in accordance with an embodiment.

FIG. 1B is a cross section 105 of the HMD 100 shown in FIG. 1A. The cross section 105 of the HMD 100 includes an eye tracking module 135, a tiling display block 140, and an exit pupil 150. The exit pupil 150 is a location where the eye is positioned when the user wears the HMD 100. For purposes of illustration, FIG. 1B shows a cross section of the HMD 100 associated with a single eye 160, but another tiling display block, separate from the tiling display block 140, provide altered image light to another eye 160 of the user.

The eye tracking module 135 tracks an eye position and eye movement of a user of the HMD 100. A camera or other optical sensor inside the HMD 100 captures information of user's eyes, and the eye tracking module 135 uses the captured information to determine interpupillary distance, interocular distance, a three-dimensional (3D) position of each eye relative to the HMD 100 (e.g., for distortion adjustment purposes), including a magnitude of torsion and rotation (i.e., roll, pitch, and yaw) and gaze directions for each eye. In some configurations, the eye tracking module 135 tracks eye positions corresponding to one or more eyebox regions associated with the HMD 100. The eyebox region is a region that outputs an image light corresponding to the media presented through the HMD 100. In one example, the eyebox region includes a length of 20 mm and a width of 10 mm.

The tiling display block 140 is a display assembly that generates and outputs an image light to present media to user's eyes. The tiling display block 140 includes a display source and a plurality of optical components (e.g. lens, mirrors, beam splitters, etc.) as described in detail below in conjunction with FIG. 2. In some embodiments, the HMD 100 includes a plurality of tiling display block 140 that generate and output a plurality of image light to present media to each of the user's eyes 160.

Figure 2:
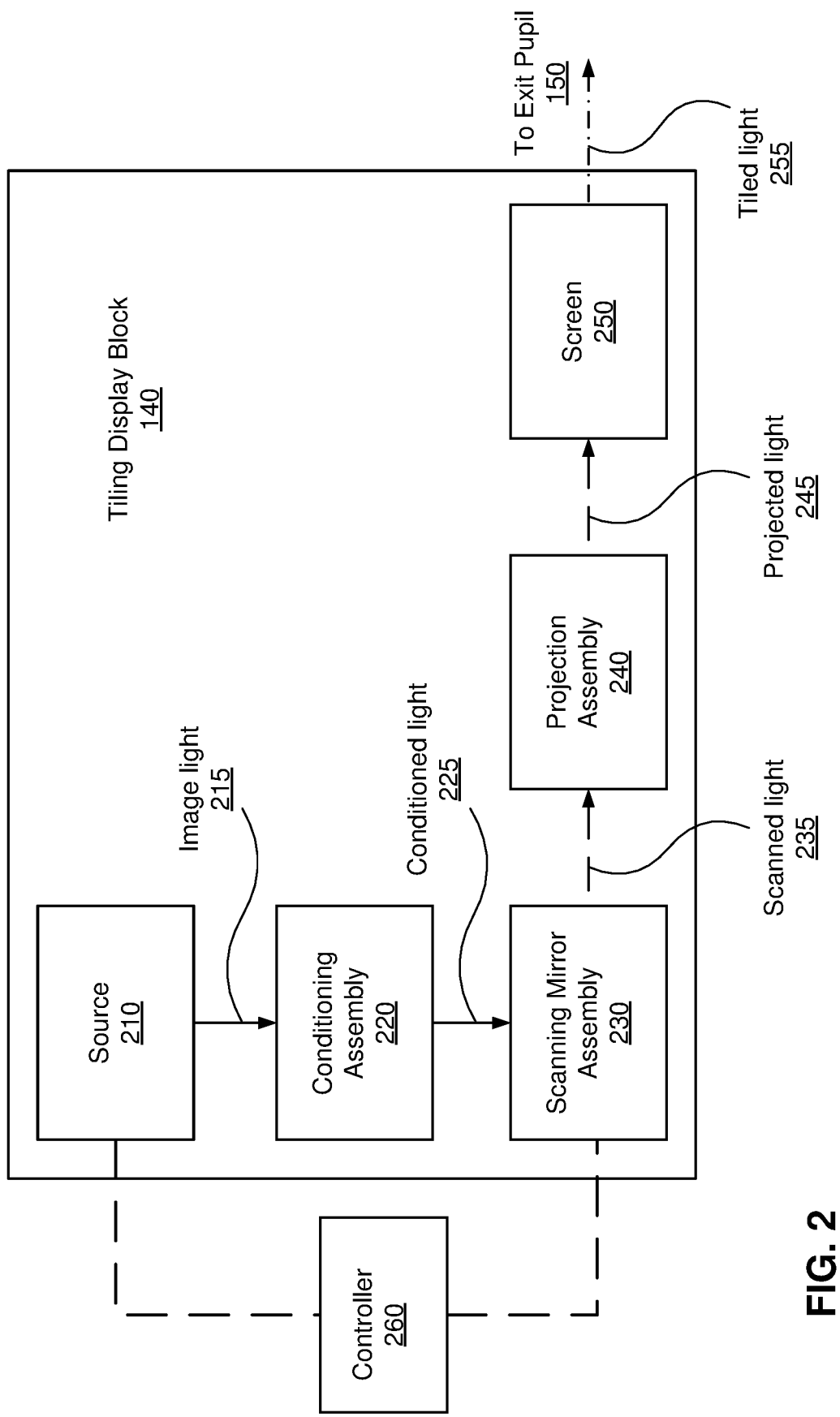
FIG. 2 is a block diagram showing the components of a tiling display block, in accordance with an embodiment.

FIG. 2 is a block diagram showing the components of the tiling display block 140, in accordance with an embodiment. The tiling display block 140 includes a source 210, a conditioning assembly 220, a scanning mirror assembly 230, a projection assembly 240, a screen 250, and a controller 260. In alternate embodiments, the tiling display block 140 includes a plurality of sources 210 and a plurality of tiled screens 250.

The source 210 is a source of light that emits at least a coherent or partially coherent image light. The source 210 emits light in accordance with one or more illumination parameters received from the controller 260. The source 210 includes one or more source elements (not shown). The source element may be LEDs with ultra-high brightness, low power consumption, and a low footprint. The source element may be, e.g., MicroLEDs, organic LEDs (OLEDs), a superluminescent LED (SLED), and organic MicroLEDs. A MicroLED is a LED that can be made small such that light emission area can be made to the order of a micron to a few tens of microns. For example, GaN-based inorganic LEDs can be made orders of magnitude brighter than OLEDs with a light emission area of few microns. The source 210 emits an image light 215 to a conditioning assembly 220. In some embodiments, the source light 215 emits one or more colors (e.g. red, green, and blue).

In some embodiments, the source 210 performs a flashing of the image light 215 for one or more flashing times. A flashing time is a time period between a first instance corresponding to the source 210 not emitting an image light and a second instance corresponding to the source 210 emitting an image light immediately after the first instance. The flashing time of the source 210 is typically in the order of few milliseconds. In one example, the source 210 flashes the image light 215 for a flashing time of 2.5 milliseconds.

The conditioning assembly 220 conditions the image light 215 and directs a conditioned light 225 to the scanning mirror assembly 230. The conditioned light 225 is a light conditioned for incidence on the scanning mirror assembly 230. The conditioning assembly 220 includes one or more optical components (e.g., positive lenses) that condition the light from the source 210. Conditioning light from the source 210 may include, e.g., expanding, collimating, correcting for one or more optical errors (e.g. field curvature, chromatic aberration, etc.), some other adjustment of the light, or some combination thereof. The conditioning assembly 220 conditions the image light 215 to fit within an aperture of the scanning mirror assembly 230. In some configurations, the conditioning assembly 220 conditions the image light 215 based on software techniques to accommodate for distortion of the scanning mirror assembly 230. In one example, the conditioning assembly 220 conditions the image light 215 for distortion of the image light 215 due to a tiled section of a quadrant of the image light 215 that an image will be displayed, or any adjustments due to painting a higher resolution image where an user's eye 160 is looking at. In some embodiments, the conditioning assembly 220 includes diffraction gratings, liquid crystal gratings, or some combination thereof.

The scanning mirror assembly 230 performs a redirection of an incident image light by orienting to a new position along one or more axis of rotation. The scanning mirror assembly 230 includes one or more optical elements that redirect image light via one or more reflective portions of the scanning mirror assembly 230. Where the image light is redirected toward is based on specific orientations of the one or more reflective portions. In some embodiments, the scanning mirror assembly 230 includes a single scanning mirror that is configured to scan in at least two dimensions. In other embodiments, the scanning mirror assembly 230 includes a plurality of scanning mirrors that each scan in orthogonal directions to each other. The scanning mirror assembly 230 may raster scan (horizontally, or vertically). In some embodiments, the scanning mirror assembly 230 performs a controlled vibration along the horizontal and/or vertical directions with a specific frequency of oscillation to scan along two dimensions and generate a two-dimensional projected line image in a tiled manner of the media presented to user's eyes. For example, the scanning mirror assembly 230 may undergo an oscillation with peak-to-peak amplitude of few hundreds of nanometers per second along the vertical direction based on the desired frequency of oscillation. The scanning mirror assembly 230 emits a scanned light 235 based on the conditioned light 225. In some embodiments, the scanning mirror assembly 230 scans adjacent tiled portions in a manner that reduces visibility of a border between the adjacent tiled portions.

In some embodiments, the scanning mirror assembly 230 includes one or more microelectromechanical scanning mirrors that resonantly oscillate along two orthogonal axes with a resonant oscillation frequency along each of the two orthogonal axes in the range of 20 kHz to 50 kHz. In another embodiment, the scanning mirror assembly 230 includes two or more galvanometric scanning mirrors. For example, the galvanometric scanning mirror may represent any electromechanical instrument that indicates that it has sensed an electric current by deflecting a beam of image light with one or more mirrors. The galvanometric scanning mirror may be configured to scan in at least one orthogonal dimension to generate the scanned light 235. The scanned light 235 from the galvanometric scanning mirror represents a two-dimensional line image of the media presented to user's eyes.

The projection assembly 240 projects the scanned light 235 on to an optical screen at one or more locations. The projection assembly 240 adds any beam forming needed due to a distortion of the scanning mirror assembly 230. The projection assembly 240 adds any beam forming needed due to a segment of an image that is being displayed to the user's eye 160. The projection assembly 240 also expands the image as needed to insure the correct size, resolution or other desired optical quality factor is displayed to the user's eye 160. The projection assembly 240 directs the received scanned light 235 as a projected light 245 to a screen 250.

The screen 250 is an optical screen that outputs a display to one or more eye box regions. The screen 250 includes a plurality of tiled images as described in detail below in conjunction with FIG. 3. The screen 250 is composed of one or more materials including, but not restricted to glass, plastic, an uncoated metal, a polarization coated metal film, etc. In one example, the screen 250 is a sheet of plastic with a transparent, thin coating of metal to obtain a desired ratio of reflection to transmission. In some configurations, the screen 250 is a semi-transparent screen configured to transmit 50% of the incident light and reflect 50% of the incident light. In another example, the screen 250 includes a dichroic optical coating to divide an incident image light into a plurality of spectrally distinct output beams. The screen 250 splits one or more beams of image light incident on the surface and outputs a phase shifted plurality of spectrally distinct output beams.

The screen 250 outputs a tiled light 255 to the user's eye 160. In some configurations, the screen 250 is a curved screen with a curvature along any arbitrary direction to mechanically and optically focus the tiled light 255 to the exit pupil 150. For example, the screen 250 includes a cylindrical curvature, a spherical curvature, or some combination thereof. The tiled light 255 includes a plurality of portions of images in a scene presented to the user's eye 160. In some embodiments, the tiled light 255 includes four or more portions of images in the scene. In one example, the tiled light 255 includes four quadrants corresponding to four instances of a single image in the scene as illustrated below in conjunction with FIG. 4A-B.

The controller 260 controls the source 210 and the scanning mirror assembly 230. The controller 260 takes content for display, and divides the content into discrete sections. The controller 260 instructs the source 210 to sequentially present the discrete sections based on a set of flashing times. The controller 260 instructs the scanning mirror assembly 230 to scan the presented discrete sections to different areas of a coupling element of an output waveguide (not shown). While each discrete section is presented at different times, the presentation and scanning of the discrete sections occurs fast enough such that a user's eye integrates the different sections into a single image or series of images.

The controller 260 instructs the source 210 to shift the pixels corresponding to the image light 215 such that the user's eyes do not see a border of each portion of an output image. In some embodiments, the controller 260 instructs the eye tracking module 135 to perform a stitching of the portions of images based on an amount of shift in pixels introduced by the source 210. The controller 260 sends scanning instructions to the scanning mirror assembly 230 to perform a backtracking of the stitched portions of the images. The backtracking is based on a redirection of multiple portions of the image light emitted by the source 210. In one example, the controller 260 instructs the source 210 to emit a first portion of an output image. The controller 260 instructs the scanning mirror assembly 230 to direct the first portion of the output image to a first position. The controller 260 instructs the source 210 to emit a second portion of the output image. The controller 260 instructs the scanning mirror assembly 230 to redirect the second portion to a second position that is adjacent to the first portion. For example, the controller 260 instructs the scanning mirror assembly 230 to scan a first portion of the stitched image. The controller 260 instructs the scanning mirror assembly 230 to scan a second portion of the stitched image responsive to the backtracking of the first portion of the stitched image.

In alternate embodiments, the controller 260 instructs the source 210 which in turn communicates to the conditioning assembly 220 that performs an optical correction of the image light 215. In one example, the controller 260 sends a set of instructions to reduce the distortion of the image light 215.

Figure 3:
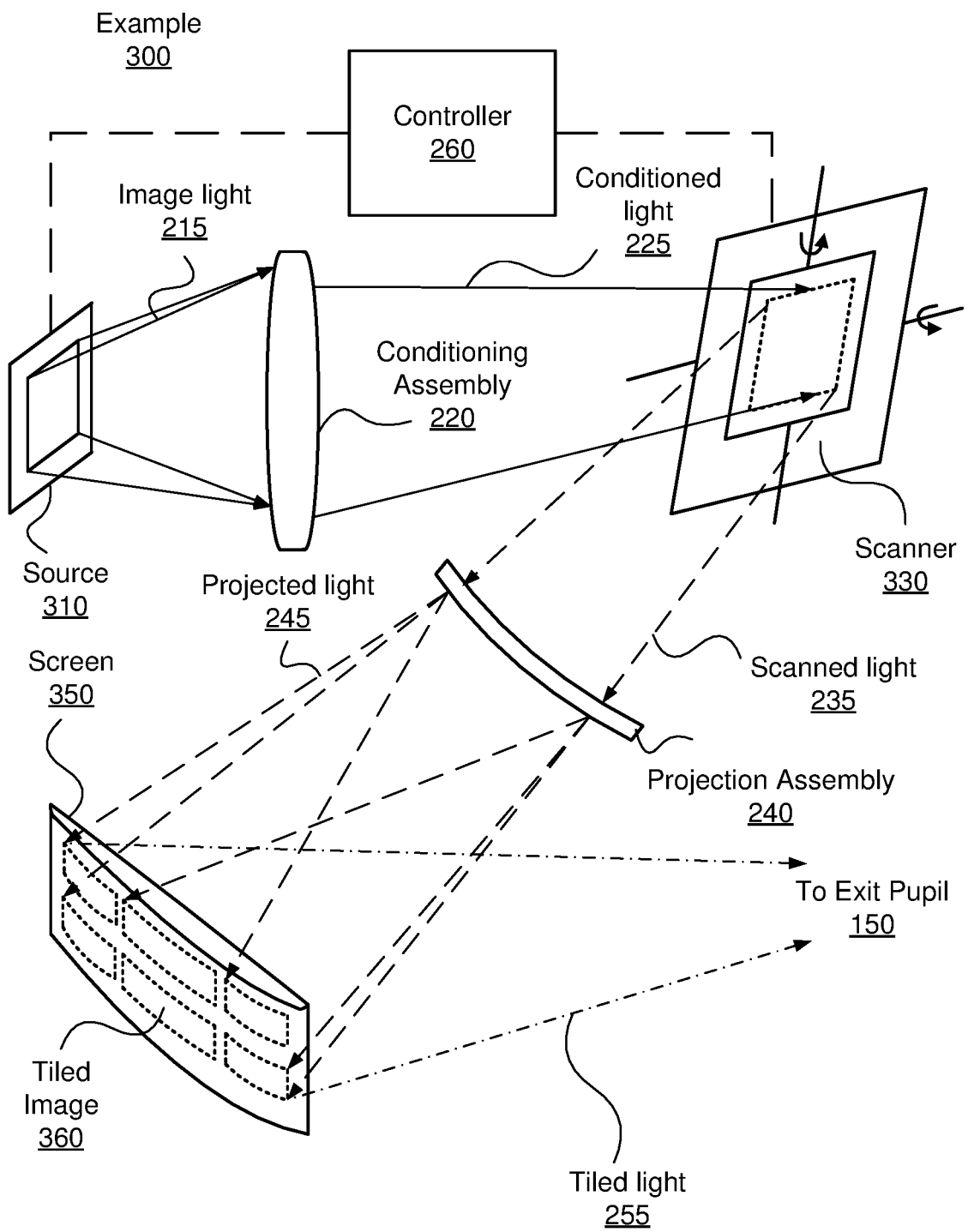
FIG. 3 is an example of the tiling display block of FIG. 2, in accordance with an embodiment.

FIG. 3 is an example 300 of the tiling display block 140 of FIG. 2, in accordance with an embodiment. The example 300 includes the collimation assembly 220, the projection assembly 240, the controller 260, a source 310, a scanner 330, and a screen 350. Some embodiments of the tiling display block 140 have different components than those described here. Similarly, in some cases, functions can be distributed among the components in a different manner than is described here.

The source 310 is an embodiment of the source 210. In the example 300, the source 310 is an OLED source. In alternate configurations, the source 310 includes an 1-D array of MicroLEDs, Superluminous LEDs, a 2-D array of MicroLEDs, or any combination thereof. In one example, the source 310 is a monochrome array of MicroLEDs, a full color array of MicroLEDs, an infrared array of MicroLEDs, or some combination thereof. The scanner 330 is an embodiment of the scanning mirror assembly 230. In the example 300, the scanner 330 is a MEMS-based resonant scanner that can scan along two dimensions with a scanning frequency of less than 1 kHz for the slow axis and a scanning frequency in the range of 20 to 40 kHz for the fast axis. The scanner 300 has a diameter in the range of 1 to 3 mm, a mechanical scan angle along the slow axis in the range of 5 to 10 degrees, and a mechanical scan angle along the fast axis in the range of 10 to 15 degrees. In some embodiments, the scanner 330 scans adjacent tiled portions in a manner that reduces visibility of a border between the adjacent tiled portions. The screen 350 is an embodiment of the screen 250. In the example 300, the screen 350 is a semi-transparent screen configured to transmit 50% of the incident light and reflect 50% of the incident light.

As described above in conjunction with FIG. 2, the example 300 shows the source 310 emitting the image light 215 to the conditioning assembly 220. The conditioning assembly 220 directs the conditioned light 225 to the MEMS scanner 330. The MEMS scanner 330 reflects the conditioned light 225 to output the scanned light 235. The projection assembly 240 directs the projected light 245 to the screen 350. The screen 350 outputs the tiled light 255 to the exit pupil 150. The one or more eyebox locations receive the tiled light 255 from the screen 350 through the exit pupil 150. The tiled light 255 includes one or more tiled images 360 as described below in conjunction with FIG. 4A-B.

In some embodiments, the MEMS scanner 330 performs a controlled vibration along the horizontal and/or vertical directions with a specific frequency of oscillation to scan along two dimensions. For example, the MEMS scanner 330 may scan less than 7 degrees in a vertical dimension and less than 12 degrees in a horizontal dimension to double the resolution of the image light 215.

In a different embodiment, the source 310 performs a controlled vibration along the horizontal and/or vertical directions with a specific frequency of oscillation to scan along two dimensions. In an alternate embodiment, the source 310 and the MEMS scanner 330 perform the controlled vibration along the horizontal and vertical dimensions with the specific frequency of oscillation to scan along two dimensions.

The optical path of the image light 215 is only an example. Alternatively, the image light 215 can undergo several other optical paths before reaching the user's eye after passing through one or more components illustrated in the example 300.

Figure 4A:
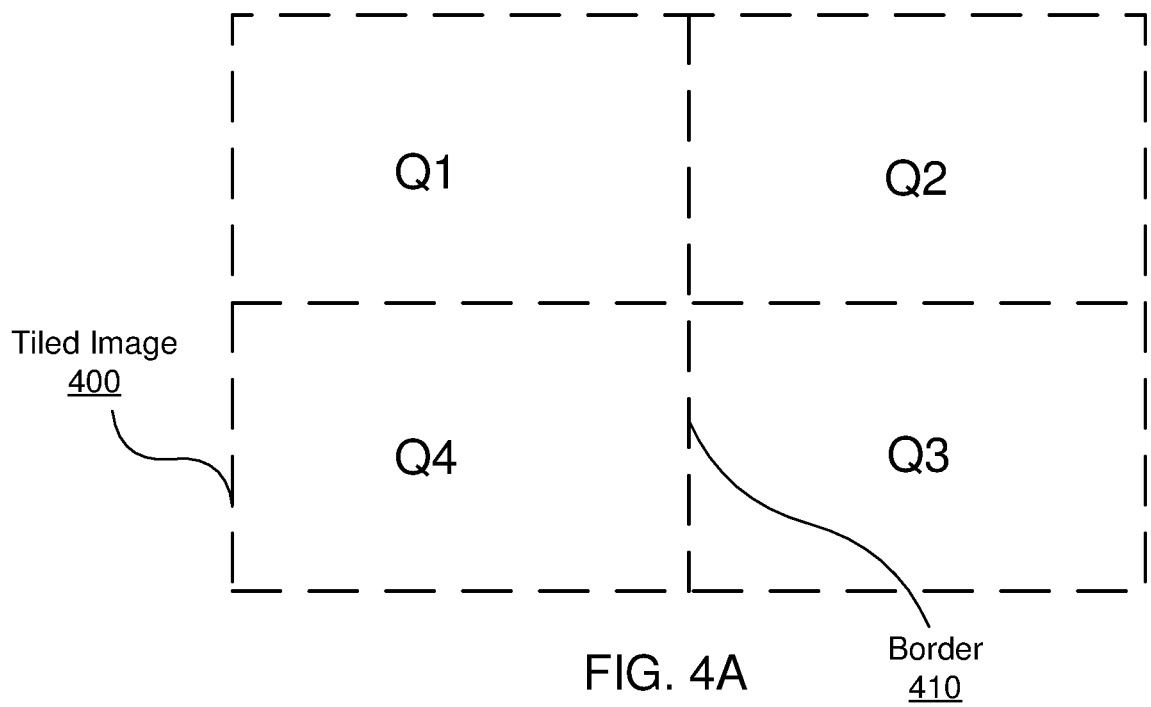
FIG. 4A is an illustration of a tiled image in a non-overlapped tiling process, in accordance with an embodiment.

FIG. 4A is an illustration of a non-overlapped tiling of a tiled image 400, in accordance with an embodiment.

The tiled image 400 is a portion of an image light outputted by a screen (e.g., the screen 350) to user's eyes. The tiled image 400 is an embodiment of the tiled image 360. The tiled image 400 includes four quadrants corresponding to the four portions of an image in a scene presented to user's eyes and a plurality of borders 410. Each of the plurality of borders 410 is a side along the perimeter of each of the four quadrants. In the embodiment of FIG. 4A, the tiled image 400 is a combination of four portions (Q1, Q2, Q3 and Q4) that are tiled without any overlap among any one of the four portions of the image. In one example, the first quadrant (Q1) is the first portion of the image presented for duration of 2.5 ms. The second quadrant (Q2) is the second portion of the image presented for another flashing time of 2.5 ms.

Turning back to our discussion of FIG. 2, the controller 260 instructs the source 210 to flash the first quadrant (Q1) for a threshold value of flashing time. The controller 260 instructs the scanning mirror assembly 230 to direct the first quadrant (Q1) to the projection assembly 240. The projection assembly 240 projects the first quadrant (Q1) to a first position on the screen 250. The controller 260 instructs the source 210 to flash the second quadrant (Q2) for the threshold value of flashing time. The controller 260 instructs the scanning mirror assembly 230 to redirect the second quadrant (Q2) to the projection assembly 240. The projection assembly 240 projects the second quadrant (Q2) to a second position on the screen 250 that is adjacent to the first portion. The controller 260 instructs the source 210 to flash the third quadrant (Q3) for the threshold value of flashing time. The controller 260 instructs the scanning mirror assembly 230 to direct the third quadrant (Q3) to the projection assembly 240. The projection assembly 240 projects the third quadrant (Q3) to a third position on the screen 250 adjacent to the second position. The controller 260 instructs the source 210 to flash the fourth quadrant (Q4) for the threshold value of flashing time. The controller 260 instructs the scanning mirror assembly 230 to redirect the fourth quadrant (Q4) to the projection assembly 240. The projection assembly 240 projects the fourth quadrant (Q4) to a fourth position on the screen 250 that is adjacent to both the third position and the first portion. In the example of FIG. 4A, the controller 260 performs a backtracking of the first portion of the image projected to the first position on the screen 250 by instructing the scanning mirror assembly 230 to redirect the second portion of the image to the second position adjacent to the first position. The controller 260 performs the backtracking to avoid any overlap of the border 410 while stitching the first portion and the second portion of the image in the scene presented to user's eyes. In an alternate example, the controller 260 instructs the source 210 to flash the fourth quadrant (Q4) for a threshold value of flashing time prior to flashing the third quadrant (Q3), the second quadrant (Q2), and the first quadrant (Q1). In some embodiments, the controller 260 adjusts light emitted from some of the source elements to reduce resolution in an overlap region between adjacent tiled portions, and the reduced resolution in the overlap region reduces visibility of the overlap region between the adjacent tiled portions.

Figure 4B:
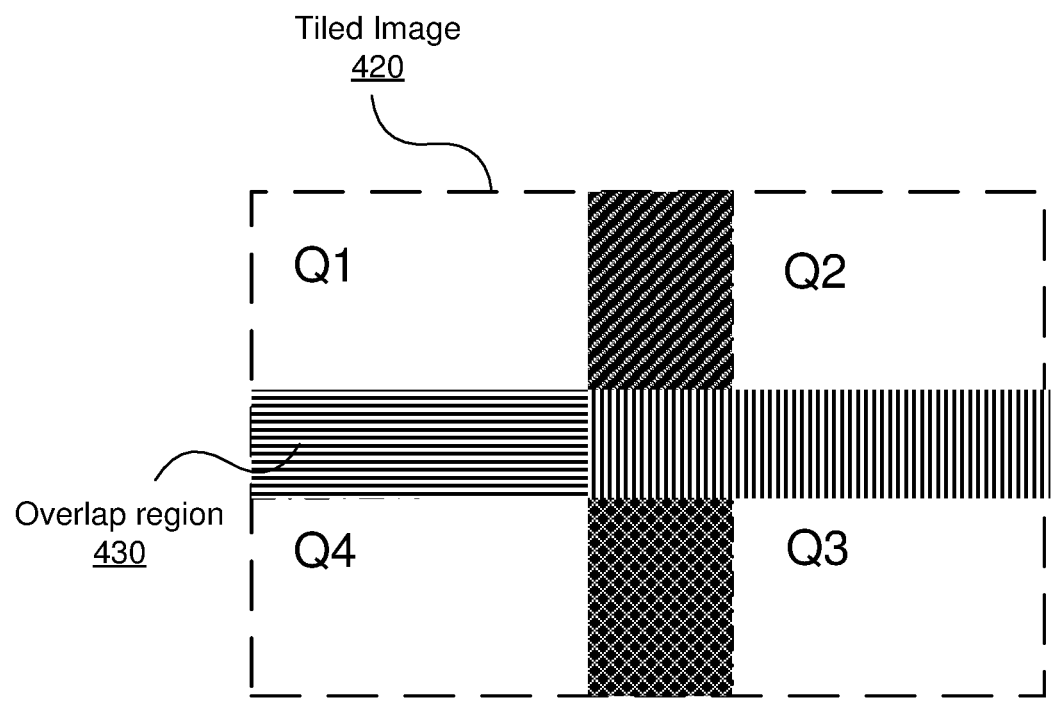
FIG. 4B is an illustration of a tiled image in an overlapped tiling process, in accordance with an embodiment.

FIG. 4B is an illustration of an overlapped tiling of a tiled image 420, in accordance with an embodiment. The tiled image 420 is similar to the tiled image 400 except for the structure including an overlap region 430.

In the overlapped tiling process of FIG. 4B, the tiled image 420 is a combination of four portions (Q1, Q2, Q3 and Q4) that are tiled with an overlap among each of the four portions of the image. The overlap of the four portions is determined based on an area where the user's eye 160 is currently looking at. The overlap corresponds to a region with a relatively higher resolution or frame rate when compared to the rest of the tiled image 420. The overlap of the four portions can be an overlap along a vertical dimension, an overlap along a horizontal dimension, or some combination thereof. For example, the first quadrant (Q1) and the second quadrant (Q2) undergo the overlap for a threshold value of flashing time. The overlapped tiling forms the overlap region 430 by subsequent overlapping of the second quadrant (Q2) and the third quadrant (Q3), the third quadrant (Q3) and the fourth quadrant (Q4), and the fourth quadrant (Q4) and the first quadrant (Q1) for the threshold value of flashing time. In some embodiments, the controller 260 adjusts light emitted from some of the source elements to reduce resolution in an overlap region between adjacent tiled portions, and the reduced resolution in the overlap region reduces visibility of the overlap region between the adjacent tiled portions.

Turning back to our discussion of FIG. 1, in some embodiments, the eye tracking module 135 tracks the movement of the user's eye 160 such that the border of each of the four portions (Q1, Q2, Q3 and Q4) and the overlap region 430 are not visible to each of the user's eyes at the end of the overlapped tiling process. The controller 260 adjusts a position of the scanning mirror assembly 230 such that the center of rotation of the scanning mirror assembly 230 is at the center of an optical axis of the user's eye. While the plurality of borders 410 of the four portions (Q1, Q2, Q3 and Q4) are visible to the user, the plurality of borders 410 are located in the periphery of the user's vision. In some configurations, the eye tracking module 135 performs a software-based technique to adjust the resolution of each portion of the tiled image 420 to minimize the stitching error during the overlapped tiling process. With information about the location where the user's eye is looking at, the tracking module 135 adjusts where the stitching occurs to ensure that the stitching is in the periphery of an image in a viewable media presented to user's eyes. This allows the HMD 100 to have a lower resolution where the stitching occurs.

System Overview

Figure 5:
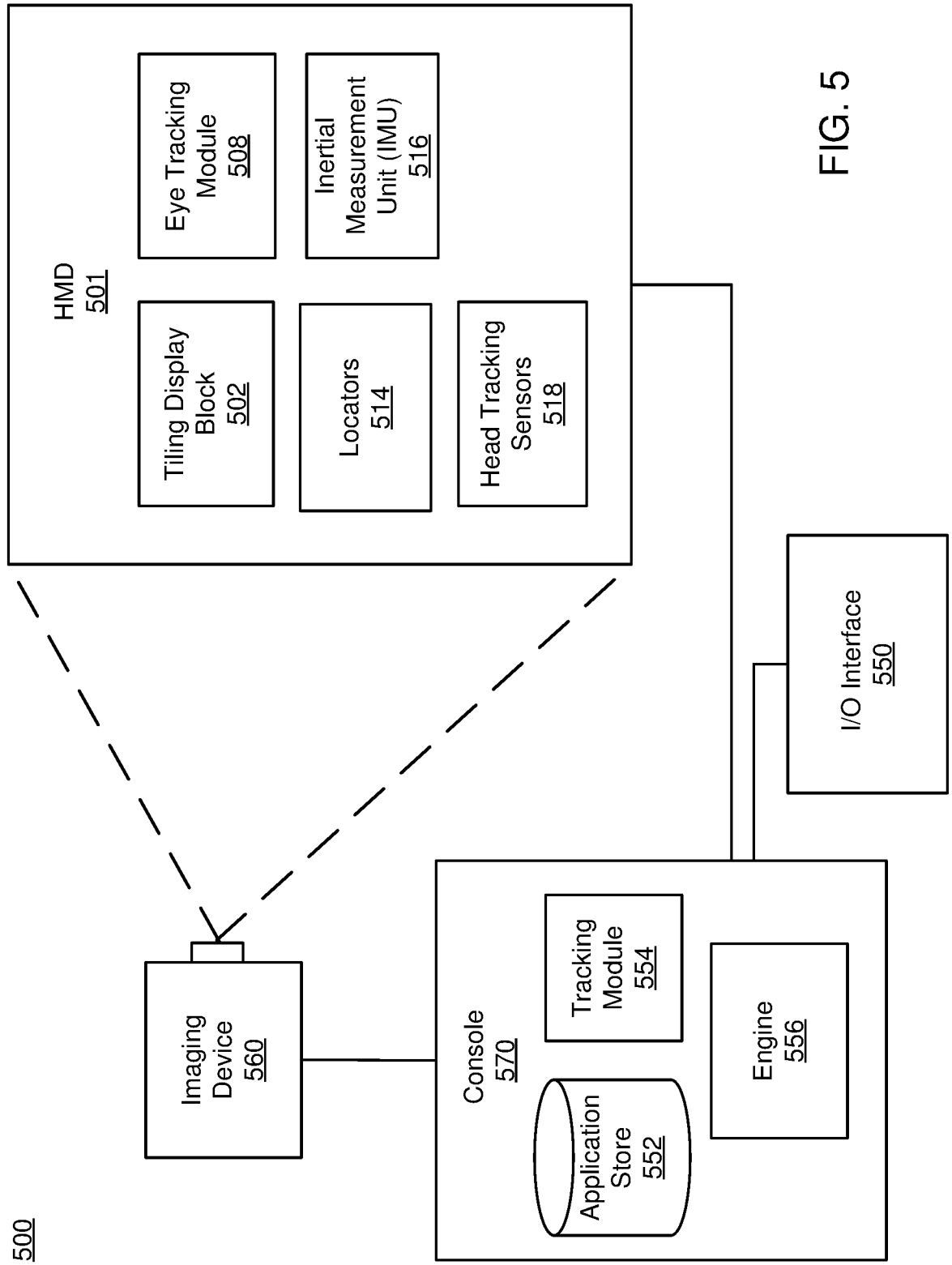
FIG. 5 shows an example system, in accordance with an embodiment.

FIG. 5 shows an example system 500, in accordance with an embodiment. In some embodiments, the system 500 may operate in a virtual reality (VR) system environment, an augmented reality (AR) system environment, a mixed reality (MR) system environment, or some combination thereof. The system 500 shown by FIG. 5 comprises an HMD 501 and an input/output (I/O) interface 550 that are communicatively coupled to a console 570. While FIG. 5 shows an example system 500 including one HMD 501 and an I/O interface 550, in other embodiments, any number of these components may be included in the system 500. For example, there may be multiple HMDs 501 each having an associated I/O interface 550, with each HMD 501 and I/O interface 550 communicating with the console 570. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 570 is provided by the HMD 501.

The HMD 501 is a head-mounted display that presents content to a user. Example content includes images, video, audio, or some combination thereof. Audio content may be presented via a separate device (e.g., speakers and/or headphones) external to the HMD 501 that receives audio information from the HMD 501, console 570, or both. The HMD 501 includes a tiling display block 502, an eye tracking module 508, a plurality of locators 514, an inertial measurement unit (IMU) 516, and head tracking sensors 518. In some embodiments, the HMD 501 may also or alternatively act as an augmented reality (AR) and/or mixed reality (MR) HMD. In these embodiments, the HMD 501 augments views of a physical, real-world environment with computer-generated elements (e.g., images, video, sound, etc.).

The tiling display block 502 presents visual information (i.e., image light) from an electronic signal. The tiling display block 502 is an embodiment of the tiling display block 140. The tiling display block 502 includes a display source and a plurality of optical components (e.g. lens, mirrors, beam splitters, etc.). The tiling display block 502 presents the visual information for one or more flashing times (e.g. few milliseconds). An electronic display element may be, e.g., a liquid crystal display (LCD), an organic light emitting diode (OLED) display, an active-matrix organic light-emitting diode display (AMOLED), a MicroLED, a Superluminous LED, some type of flexible display, or some combination thereof. In some embodiments, the HMD 501 includes a plurality of tiling display blocks 502 that generate and output a plurality of image light to present media to each of the user's eyes.

The eye tracking module 508 tracks an eye position and eye movement of a user of HMD 501. The eye tracking module 508 communicates the tracked eye position and eye movement to the controller 260 of FIG. 2. Accordingly, the controller 260 provides a set of scanning instructions to the tiling display block 502. For example, the set of scanning instructions include a location of the plurality of borders 410 associated with each of the quadrants, as described above in conjunction with FIG. 4A, that are made invisible to user's eyes.

A camera or other optical sensor inside the HMD 501 captures information of a user's eyes, and the eye tracking module 508 uses the captured information to determine interpupillary distance, interocular distance, a three-dimensional (3D) position of each eye relative to the HMD 501 (e.g., for distortion adjustment purposes), including a magnitude of torsion and rotation (i.e., roll, pitch, and yaw) and gaze directions for each eye. In one example, infrared light is emitted within the HMD 501 and reflected from each eye. The reflected light is received or detected by the camera and analyzed to extract eye rotation from changes in the infrared light reflected by each eye. Many methods for tracking the eyes of a user can be used by the eye tracking module 508. Accordingly, the eye tracking module 508 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye tracking module 508 integrates information from past measurements, measurements identifying a position of a user's head, and 3D information describing a scene presented by the tiling display block 502. Thus, information for the position and orientation of the user's eyes is used to determine the gaze point in a virtual scene presented by the HMD 501 where the user is looking.

The locators 514 are objects located in specific positions on the HMD 501 relative to one another and relative to a specific reference point on the system 500. Locators 514 may be a light emitting diode (LED), a corner cube reflector, a reflective marker, a type of light source that contrasts with an environment in which the HMD 501 operates, or some combination thereof. Active locators 514 (i.e., an LED or other type of light emitting device) may emit light in the visible band (~380 nm to 750 nm), in the infrared (IR) band (~750 nm to 2,000 nm), in the ultraviolet band (150 nm to 380 nm), some other portion of the electromagnetic spectrum, or some combination thereof.

The locators 514 can be located beneath an outer surface of the system 500, which is transparent to the wavelengths of light emitted or reflected by locators 514 or is thin enough not to substantially attenuate the wavelengths of light emitted or reflected by the locators 514. Further, the outer surface or other portions of the HMD 501 can be opaque in the visible band of wavelengths of light. Thus, the locators 514 may emit light in the IR band while under an outer surface of the HMD 501 that is transparent in the IR band but opaque in the visible band.

The IMU 516 is an electronic device that generates fast calibration data based on measurement signals received from a plurality of head tracking sensors 518, which generate a plurality of measurement signals in response to motion of the HMD 501. Examples of head tracking sensors 518 include accelerometers, gyroscopes, magnetometers, other sensors suitable for detecting motion, correcting error associated with the IMU 516, or some combination thereof. Head tracking sensors 518 may be located external to the IMU 516, internal to the IMU 516, or some combination thereof.

Based on the measurement signals from head tracking sensors 518, the IMU 516 generates fast calibration data indicating an estimated position of the HMD 501 relative to an initial position of the HMD 501. For example, the head tracking sensors 518 include multiple accelerometers to measure translational motion (forward/back, up/down, left/right) and multiple gyroscopes to measure rotational motion (e.g., pitch, yaw, and roll). IMU 516 can, for example, rapidly sample the measurement signals and calculate the estimated position of the HMD 501 from the sampled data. For example, the IMU 516 integrates measurement signals received from the accelerometers over time to estimate a velocity vector and integrates the velocity vector over time to determine an estimated position of a reference point on the HMD 501. The reference point is a point that may be used to describe the position of the HMD 501. While the reference point may generally be defined as a point in space, in various embodiments, reference point is defined as a point within the HMD 501 (e.g., a center of the IMU 516). Alternatively, the IMU 516 provides the sampled measurement signals to the console 570, which determines the fast calibration data.

The IMU 516 can additionally receive a plurality of calibration parameters from the console 570. As further discussed below, the plurality of calibration parameters are used to maintain tracking of the HMD 501. Based on a received calibration parameter, the IMU 516 may adjust a plurality of IMU parameters (e.g., sample rate). In some embodiments, certain calibration parameters cause the IMU 516 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The imaging device 560 generates slow calibration data in accordance with calibration parameters received from the console 570. Slow calibration data includes a plurality of images showing observed positions of the locators 514 that are detectable by the imaging device 560. The imaging device 560 may include a plurality of cameras, a plurality of video cameras, other devices capable of capturing images including a plurality of locators 514, or some combination thereof. Additionally, the imaging device 560 may include a plurality of filters (e.g., for increasing signal to noise ratio). The imaging device 560 is configured to detect light emitted or reflected from the locators 514 in a field of view of the imaging device 560. In embodiments where the locators 514 include passive elements (e.g., a retroreflector), the imaging device 560 may include a light source that illuminates some or all of the locators 514, which retro-reflect the light towards the light source in the imaging device 560. Slow calibration data is communicated from the imaging device 560 to the console 570, and the imaging device 560 receives a plurality of calibration parameters from the console 570 to adjust a plurality of imaging parameters (e.g., focal length, focus, frame rate, ISO, sensor temperature, shutter speed, aperture, etc.).

The I/O interface 550 is a device that allows a user to send action requests to the console 570. An action request is a request to perform a particular action. For example, an action request may be to start or end an application or to perform a particular action within the application. The I/O interface 550 may include a plurality of input devices. Example input devices include a keyboard, a mouse, a game controller, or any other suitable device for receiving action requests and communicating the received action requests to the console 570. An action request received by the I/O interface 550 is communicated to the console 570, which performs an action corresponding to the action request. In some embodiments, the I/O interface 550 may provide haptic feedback to the user in accordance with instructions received from the console 570. For example, haptic feedback is provided by the I/O interface 550 when an action request is received, or the console 570 communicates instructions to the I/O interface 550 causing the I/O interface 550 to generate haptic feedback when the console 570 performs an action.

The console 570 provides content to the HMD 501 for presentation to the user in accordance with information received from the imaging device 560, the HMD 501, or the I/O interface 550. In the example shown in FIG. 5, the console 570 includes an application store 552, a tracking module 554, and an engine 556. Some embodiments of the console 570 have different or additional modules than those described in conjunction with FIG. 5. Similarly, the functions further described below may be distributed among components of the console 570 in a different manner than is described here.

The application store 552 stores a plurality of applications for execution by the console 570. An application is a group of instructions, that when executed by a processor, generates content for presentation to the user. Content generated by an application may be in response to inputs received from the user via movement of the HMD 501 or the I/O interface 550. Examples of applications include gaming applications, conferencing applications, video playback application, or other suitable applications.

The tracking module 554 calibrates the system 500 using a plurality of calibration parameters and may adjust a plurality of calibration parameters to reduce error in determining position of the HMD 501. For example, the tracking module 554 adjusts the focus of the imaging device 560 to obtain a more accurate position for the observed locators 514 on the HMD 501. Moreover, calibration performed by the tracking module 554 also accounts for information received from the IMU 516. Additionally, if tracking of the HMD 501 is lost (e.g., imaging device 560 loses line of sight of at least a threshold number of locators 514), the tracking module 554 re-calibrates some or all of the VR system components.

Additionally, the tracking module 554 tracks the movement of the HMD 501 using slow calibration information from the imaging device 560 and determines positions of a reference point on the HMD 501 using observed locators from the slow calibration information and a model of the HMD 501. The tracking module 554 also determines positions of the reference point on the HMD 501 using position information from the fast calibration information from the IMU 516 on the HMD 501. Additionally, the tracking module 554 may use portions of the fast calibration information, the slow calibration information, or some combination thereof, to predict a future location of the HMD 501, which is provided to an engine 556.

The engine 556 executes applications within the system 500 and receives position information, acceleration information, velocity information, predicted future positions, or some combination thereof for the HMD 501 from the tracking module 554. Based on the received information, the engine 556 determines content to provide to the tiling display block 502 for presentation to the user, such as a virtual scene, one or more virtual objects to overlay onto a real world scene, etc.

Additionally, the engine 556 performs an action within an application executing on the console 570 in response to an action request received from the I/O interface 550 and provides feedback to the user that the action was performed. The provided feedback may be visual or audible feedback via the HMD 501 or haptic feedback via the I/O interface 550.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head mounted display (HMD) system comprising:
a light source including a plurality of source elements that are configured to emit image light;
a scanning mirror assembly configured to scan the image light at least along one dimension to form a plurality of tiled portions of scanned image light representing an output image, the scanning mirror assembly comprising one or more scanning mirrors operating within a first range of scanning frequencies along a slow axis and a second range of scanning frequencies along a fast axis, the scanning mirror assembly directing at least one of the plurality of tiled portions of the scanned image light to a first position, the scanning mirror assembly redirecting at least one of the plurality of tiled portions of the scanned image light to a second position next to the first position; and
an output screen configured to output a tiled image light to an eyebox region using the scanned image light.

2. The HMD of claim 1, wherein the plurality of source elements include at least one source element that emits semi-coherent light and at least one source element that emits coherent light.

3. The HMD of claim 1, wherein each of the one or more scanning mirrors has a diameter in the range of 1 to 3 mm.

4. The HMD of claim 1, wherein the scanning mirror assembly comprises one or more microelectromechanical scanning mirrors configured to resonantly oscillate with the first range of scanning frequencies along the slow axis of at most 1 kHz and the second range of scanning frequencies along the fast axis varying from 20 to 40 kHz.

5. The HMD of claim 1, wherein the scanning mirror assembly comprises two or more galvanometric scanning mirrors, each galvanometric scanning mirror configured to scan along at least one orthogonal axis.

6. The HMD of claim 1, wherein the scanning mirror assembly comprises one or more scanning mirrors associated with a mechanical scan angle along the slow axis in the range of 5 to 10 degrees, and a mechanical scan angle along the fast axis in the range of 10 to 15 degrees.

7. The HMD of claim 1, wherein the tiled image light comprises a plurality of quadrants corresponding to a portion of an image in a scene presented to an eye of a user, wherein a first quadrant is tiled with an overlap with a second quadrant, the overlap between the first quadrant and the second quadrant being determined based on an area where the eye is looking.

8. The HMD of claim 7, wherein the overlap among each of the plurality of quadrants is at least one of: an overlap along a vertical dimension, an overlap along a horizontal dimension, or some combination thereof.

9. The HMD of claim 1, further comprising:
an eye tracking module configured to track movement of an eye of a user;
and wherein the scanning mirror assembly is further configured to scan adjacent tiled portions in a manner that reduces visibility of a border between the adjacent tiled portions.

10. The HMD of claim 1, further comprising:
a conditioning assembly configured to transmit conditioned light based in part on the image light emitted by the light source; and
a projection assembly configured to receive the plurality of portions of scanned image light from the scanning mirror assembly and expand the scanned image light at least along one dimension.

11. A tiling display block comprising:
a light source including a plurality of source elements that are configured to emit image light;
a scanning mirror assembly configured to scan the image light at least along one dimension to form a plurality of tiled portions of scanned image light representing an output image, the scanning mirror assembly comprising one or more scanning mirrors operating within a first range of scanning frequencies along a slow axis and a second range of scanning frequencies along a fast axis, the scanning mirror assembly directing at least one of the plurality of tiled portions of the scanned image light to a first position, the scanning mirror assembly redirecting at least one of the plurality of tiled portions of the scanned image light to a second position next to the first position; and
an output screen configured to output a tiled image light to an eyebox region using the scanned image light.

12. The tiling display block of claim 11, wherein the tiling display block is a component of a near-eye display.

13. The tiling display block of claim 11, wherein each of the one or more scanning mirrors has a diameter in the range of 1 to 3 mm.

14. The tiling display block of claim 11, wherein the scanning mirror assembly comprises one or more microelectromechanical scanning mirrors configured to resonantly oscillate with the first range of scanning frequencies along the slow axis of at most 1 kHz and the second range of scanning frequencies along the fast axis varying from 20 to 40 kHz.

15. The tiling display block of claim 11, wherein the scanning mirror assembly comprises two or more galvanometric scanning mirrors, each galvanometric scanning mirror configured to scan along at least one orthogonal axis.

16. The tiling display block of claim 11, wherein the scanning mirror assembly comprises one or more scanning mirrors associated with a mechanical scan angle along the slow axis in the range of 5 to 10 degrees, and a mechanical scan angle along the fast axis in the range of 10 to 15 degrees.

17. The tiling display block of claim 11, wherein the tiled image light comprises a plurality of quadrants corresponding to a portion of an image in a scene presented to an eye of a user, wherein a first quadrant is tiled with an overlap with a second quadrant, the overlap between the first quadrant and the second quadrant being determined based on an area where the eye is looking.

18. The tiling display block of claim 17, wherein the overlap among each of the plurality of quadrants is at least one of: an overlap along a vertical dimension, an overlap along a horizontal dimension, or some combination thereof.

19. The tiling display block of claim 11, wherein an eye tracking module is configured to track movement of an eye of a user, and wherein the scanning mirror assembly is further configured to scan adjacent tiled portions in a manner that reduces visibility of a border between the adjacent tiled portions.

20. The tiling display block of claim 11, further comprising:
a controller configured to adjust light emitted from some of the plurality of source elements to reduce resolution in an overlap region between adjacent tiled portions, wherein the reduced resolution in the overlap region reduces visibility of the overlap region between the adjacent tiled portions.

* * * * *